United States Patent
Ogasawara

(10) Patent No.: US 10,003,702 B2
(45) Date of Patent: Jun. 19, 2018

(54) IMAGE FORMING APPARATUS AND IMAGE FORMING SYSTEM

(71) Applicant: KYOCERA Document Solutions Inc., Osaka (JP)

(72) Inventor: Hideyuki Ogasawara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days. days.

(21) Appl. No.: 15/651,004

(22) Filed: Jul. 17, 2017

(65) Prior Publication Data
US 2018/0027131 A1 Jan. 25, 2018

(30) Foreign Application Priority Data
Jul. 21, 2016 (JP) .................. 2016-143447

(51) Int. Cl.
| | |
|---|---|
| G06F 3/12 | (2006.01) |
| H04N 1/00 | (2006.01) |
| G10G 1/04 | (2006.01) |
| H04N 1/44 | (2006.01) |
| H04N 1/32 | (2006.01) |

(52) U.S. Cl.
CPC ........ *H04N 1/00233* (2013.01); *G10G 1/04* (2013.01); *H04N 1/00408* (2013.01); *H04N 1/32128* (2013.01); *H04N 1/4413* (2013.01); *G06F 3/1222* (2013.01); *G10H 2220/015* (2013.01)

(58) Field of Classification Search
CPC ........ H04N 1/00233; H04N 1/00408; H04N 1/00411; H04N 1/32128; H04N 1/4413; G06F 3/1222; G10H 2220/015
See application file for complete search history.

(56) References Cited

U.S. PATENT DOCUMENTS

| | | | | |
|---|---|---|---|---|
| 2004/0205636 | A1* | 10/2004 | Kasahara | G06F 17/21 715/273 |
| 2005/0207776 | A1* | 9/2005 | Nomura | G03G 21/02 399/79 |
| 2009/0201551 | A1* | 8/2009 | Uchida | H04N 1/00204 358/1.15 |
| 2009/0225334 | A1* | 9/2009 | Takamiya | H04N 1/46 358/1.9 |
| 2010/0110484 | A1* | 5/2010 | Hikosaka | H04N 1/00846 358/1.15 |
| 2010/0128325 | A1* | 5/2010 | Ohmiya | H04N 1/00342 358/448 |

(Continued)

FOREIGN PATENT DOCUMENTS

JP 2003-167695 A 6/2003

*Primary Examiner* — Moustapha Diaby
(74) *Attorney, Agent, or Firm* — Studebaker & Brackett PC

(57) ABSTRACT

An image forming apparatus includes a controller. The controller includes a list display controller, a selection receiving section, a data request section, and an image formation controller. The list display controller acquires list data from a file server and causes display of the list data in the form of a list. The selection receiving section receives user selection of an article name from the list. The data request section requests image formation data corresponding to the article name that the user has selected from the file server. The image formation controller acquires image formation data and controls formation of an article image on a paper sheet based on the image formation data.

11 Claims, 11 Drawing Sheets

(56) References Cited

U.S. PATENT DOCUMENTS

2012/0117113 A1* 5/2012 Fujisawa ........... G06F 17/30144
                                                  707/771
2015/0062612 A1* 3/2015 Nishii ................... G06F 3/1222
                                                  358/1.14

* cited by examiner

| Song title | Registration date | First price | Second price |
|---|---|---|---|
| AAA | 2016.4.1 | 100 | 50 |
| BBB | 2016.4.10 | 200 | 100 |
| CCC | 2016.4.20 | 150 | 70 |
| ⋮ | ⋮ | ⋮ | ⋮ |

FIG. 5

IMAGE FORMING APPARATUS AND IMAGE FORMING SYSTEM

INCORPORATION BY REFERENCE

The present application claims priority under 35 U.S.C. § 119 to Japanese Patent Application No. 2016-143447, filed on Jul. 21, 2016. The contents of this application are incorporated herein by reference in their entirety.

BACKGROUND

The present disclosure relates to an image forming apparatus and an image forming system.

Some information printing system includes a mobile phone. The mobile phone requests uniform resource locator (URL) information of music score data from a web server. The mobile phone then generates a URL specifying command based on the URL information for acquiring the music score data. Additionally, the mobile phone transmits the URL specifying command to a printing device.

The printing device receives the URL specifying command from the mobile phone. The printing device then transmits the URL specifying command to the web server to acquire the music score data from the web server. Furthermore, the printing device prints an image of the music score (article image) according to the music score data.

SUMMARY

An image forming apparatus according to a first aspect of the present disclosure includes a display, an image forming device, and a controller that controls the display and the image forming device. The controller includes a login execution section, a list request section, a list display controller, a selection receiving section, a data request section, and an image formation controller. The login executing section transmits login information of a user to a first server to log in the first server. The list request section requests list data indicating a list of article names of a plurality of articles from the logged-in first server. The list display controller acquires the list data from the first server and controls the display to display the list data in the form of a list. The selection receiving section receives selection of an article name of an article from among the article names listed in the list from the user. The data request section requests from the first server image formation data corresponding to the article name that the user has selected. The image formation controller acquires the image formation data and control the image forming device to form an image of the article on a sheet based on the image formation data.

An image forming system according to a second aspect of the present disclosure includes the image forming apparatus according to the first aspect and a second server that communicates with the image forming apparatus and the first server. The second server includes an acquisition section and a conversion section. The acquisition section acquires from the first server source data corresponding to the article name that the user has selected. The conversion section converts the source data to data in a data format processable by the image forming apparatus to generate the image formation data. The image formation controller of the image forming apparatus acquires the image formation data from the second server.

An image forming system according to a third aspect of the present disclosure includes the image forming apparatus according to the first aspect and the first server. The first server includes a determination section and a list transmission section. The determination section determines whether or not the login information transmitted by the login execution section of the image forming apparatus matches login information registered in the first server. The list transmission section transmits the list data corresponding to the transmitted login information to the image forming apparatus upon match between the transmitted login information and the registered login information.

BRIEF DESCRIPTION OF THE DRAWINGS

FIG. 5 indicates a list that the image forming apparatus according to the first embodiment displays on a display.

DETAILED DESCRIPTION

Figure 1:
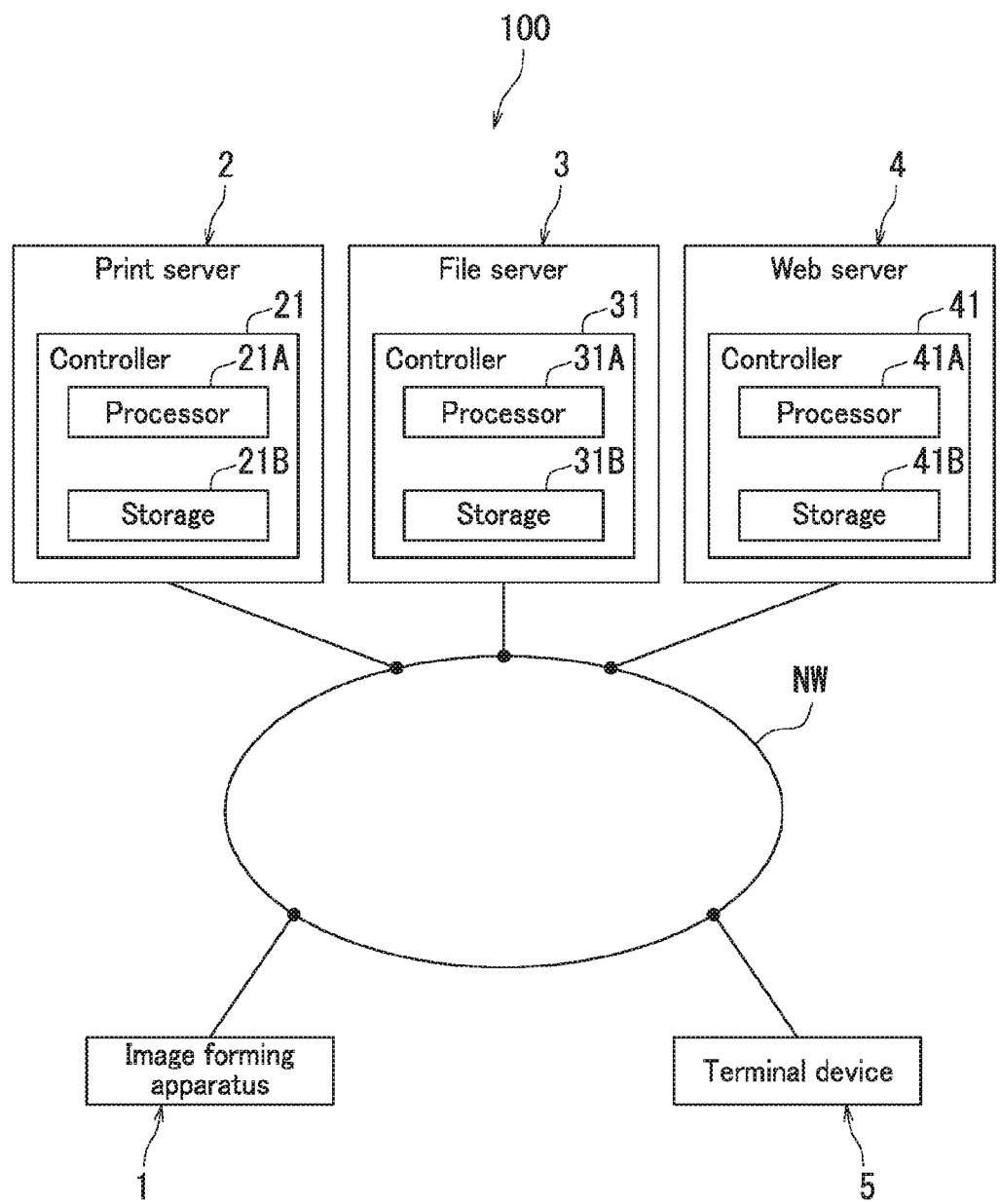
FIG. 1 illustrates configuration of an image forming system according to an embodiment of the present disclosure.

The following describes embodiments of the present disclosure with reference to the drawings (FIGS. 1-11). It should be noted that elements in the drawings that are the same or equivalent are labelled using the same reference signs and description thereof is not repeated.

Basic Configuration

Figure 2:
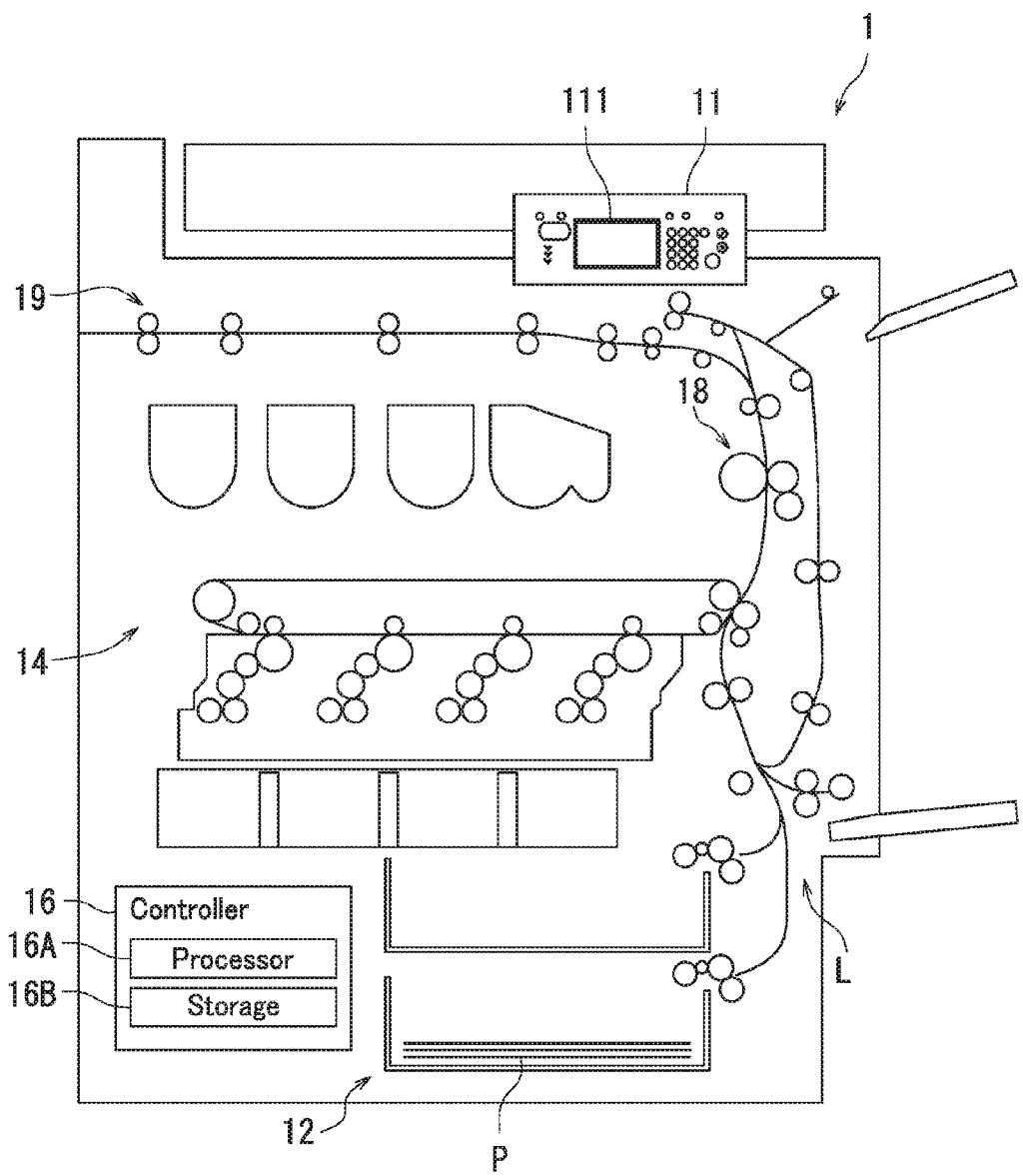
FIG. 2 illustrates configuration of an image forming apparatus according to an embodiment of the present disclosure.

Configuration of an image forming system 100 according to an embodiment of the present disclosure will be described with reference to FIGS. 1 and 2. FIG. 1 illustrates the configuration of the image forming system 100. The image forming system 100 includes an image forming apparatus 1, a print server 2, a file server 3, a web server 4, and a terminal device 5. The image forming apparatus 1, the print server 2, the file server 3, the web server 4, and the terminal device 5 communicate with one another via a network NW. Examples of the network NW include the Internet, a wide area network (WAN), and a local area network (LAN).

The image forming apparatus 1 acquires image formation data from the print server 2 and forms an image based on the image formation data on a paper sheet P. The paper sheet P corresponds to an example of a "sheet". The image formation data is in a data format processable by the image forming apparatus 1. The term "image formation data" refers to data created in a page description language (PDL) in the present embodiment. The page description language means a language in which an image to be output to the image forming apparatus 1 is described and an instruction in which is provide to the image forming apparatus 1 in printing a document and/or an image created on a computer.

The print server 2 acquires source data from the file server 3 and converts the source data to the image formation data. The source data contains either or both of text data and image data. The print server 2 transmits the image formation data to the image forming apparatus 1. The print server 2 corresponds to a "second server".

The print server 2 includes a controller 21. The controller 21 includes a processor 21A and a storage 21B. The processor 21A includes for example a central processing unit (CPU). The storage 21B includes for example a semiconductor memory and may include a hard disk drive (HDD). The storage 21B stores control programs therein.

The file server 3 stores therein various source data and transmits source data to the print server 2 in response to a request from the image forming apparatus 1. The file server 3 corresponds to a "first server".

The file server 3 includes a controller 31. The controller 31 includes a processor 31A and a storage 31B. The processor 31A includes for example a CPU. The storage 31B includes for example a semiconductor memory and may include a HDD. The storage 31B stores control programs therein.

The web server 4 performs article registration processing in response to a request from the terminal device 5. The web server 4 causes the file server 3 to store registration history of articles. The term "article" is referred to as a "music score" in the present embodiment.

The web server 4 includes a controller 41. The controller 41 includes a processor 41A and a storage 41B. The processor 41A includes for example a CPU. The storage 41B includes for example a semiconductor memory and may include a HDD. The storage 41B stores control programs therein. The processor 41A executes the control programs read out from the storage 41B to manage a website for music score registration.

The terminal device 5 accesses the web server 4 via the network NW for website display. A user accesses the website for music score registration using the terminal device 5.

Upon receiving a user operation, the terminal device 5 makes a request for music score registration to the web server 4. Specifically, the terminal device 5 requests the web server 4 to register either or both of a target music score that is to be purchased and a candidate music score that is to be purchased. The words "registration of a target music score to be purchased" refers to transitory storage of a music score to the storage 31B for account settlement (for example, registration of a music score to a shopping cart). The words "registration of a candidate music score to be purchased" refers to storage of a music score to the storage 31B in order to eliminate the need for search (for example, registration to favorites). In response to the request from the terminal device 5, the web server 4 registers the music score to the file server 3. The file server 3 stores song title data, registration date data, and price data of the music score that the user has requested to register to the storage 31B in association with login information of the user. The song title data indicates a song title of the music score. The registration date data indicates a date on which the music score is registered. The price data indicates prices of the music score. The song title corresponds to an example of an "article name". The file server 3 stores therein list data. The song title data, the registration date data, and the price data are contained in the list data. Examples of the terminal device 5 include a personal computer, a tablet terminal, and a smartphone.

Note that the image forming system 100 in the present embodiment includes, but is not limited to, the file server 3 and the web server 4. A single server may be provided that has respective functions of the file server 3 and the web server 4.

The image forming apparatus 1 according to an embodiment of the present disclosure will be described next with reference to FIG. 2. FIG. 2 illustrates configuration of the image forming apparatus 1. As illustrated in FIG. 2, the image forming apparatus 1 is a color copier.

The image forming apparatus 1 forms an image on a paper sheet P. Specifically, the image forming apparatus 1 includes an operation panel 11, a sheet feeder 12, a conveyance device L, an image forming device 14, a fixing device 18, an ejection section 19, and a controller 16.

The operation panel 11 receives a user operation and displays various information. The operation panel 11 includes a display 111. The display 111 includes for example a liquid crystal display (LCD) and a touch sensor.

The sheet feeder 12 feeds a paper sheet P to the conveyance device L. The conveyance device L conveys the paper sheet P to the ejection section 19 through the image forming device 14 and the fixing device 18. The image forming device 14 forms an image on the paper sheet P in an electrographic manner. The fixing device 18 applies heat and pressure to the paper sheet P to fix the image formed on the paper sheet P to the paper sheet P. The ejection section 19 ejects the paper sheet P out of the image forming apparatus 1.

The controller 16 includes a processor 16A and a storage 16B and controls operation of the image forming apparatus 1. The processor 16A includes for example a CPU. The storage 16B includes for example a semiconductor memory and may include a MD. The storage 16B stores control programs therein.

First Embodiment

Figure 3:
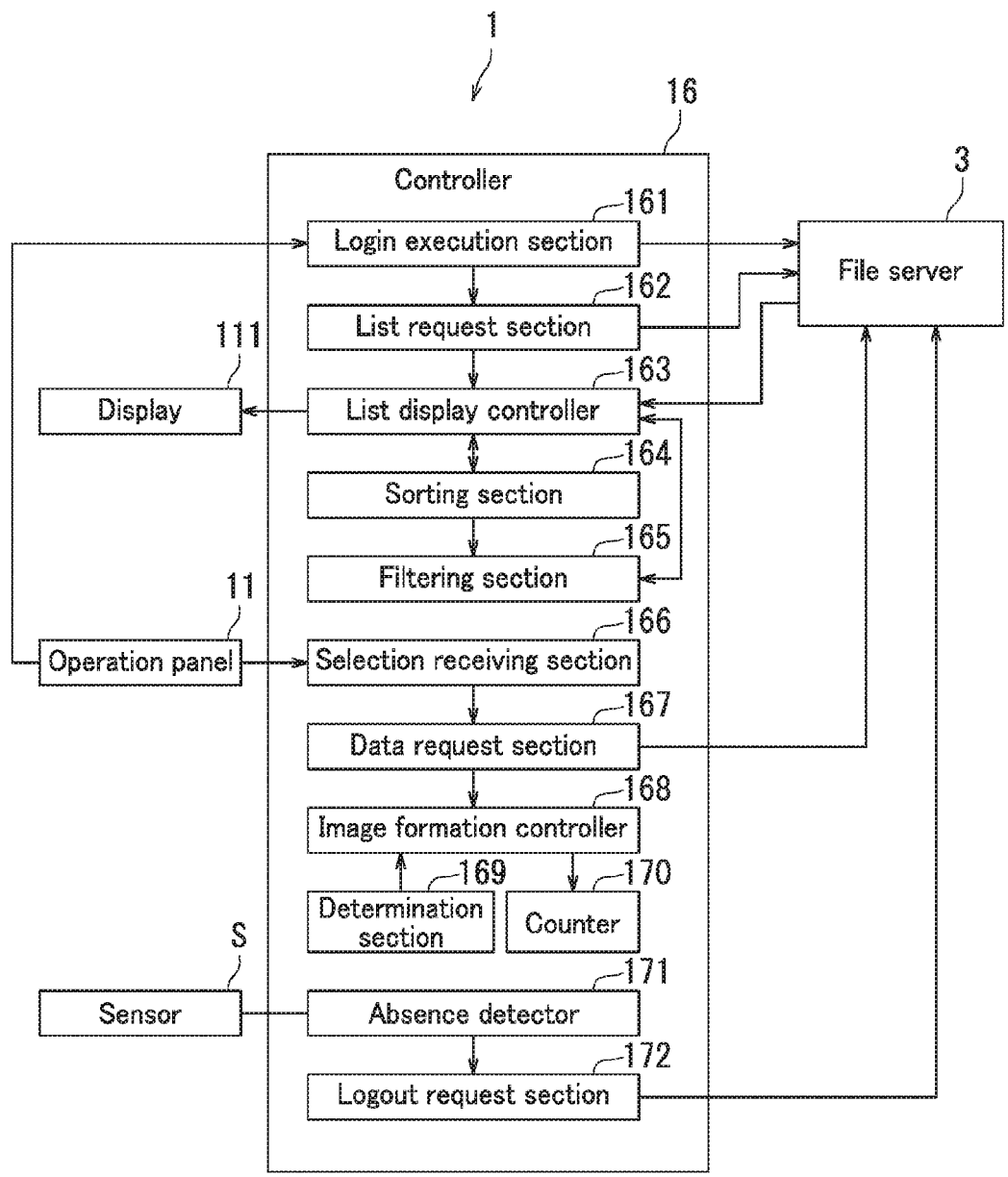
FIG. 3 depicts functions of a controller of the image forming apparatus according to a first embodiment of the present disclosure.

Functions of the image forming apparatus 1 according to a first embodiment of the present disclosure will be described next with reference to FIGS. 1-10. FIG. 3 depicts functions of the controller 16 of the image forming apparatus 1. As illustrated in FIG. 3, the controller 16 includes a login execution section 161, a list request section 162, a list display controller 163, a sorting section 164, a filtering section 165, a selection receiving section 166, a data request section 167, an image formation controller 168, a determination section 169, a counter 170, an absence detector 171, and a logout request section 172. Specifically, as illustrated in FIGS. 2 and 3, the processor 16A of the controller 16 executes the control programs read out from the storage 16B to function as the login execution section 161, the list request section 162, the list display controller 163, the sorting section 164, the filtering section 165, the selection receiving section 166, the data request section 167, the image formation controller 168, the determination section 169, the counter 170, the absence detector 171, and the logout request section 172.

The image forming apparatus 1 further includes a sensor S. The sensor S detects the presence or absence of a human body. For example, the sensor S is a pyroelectric infrared motion sensor that detects far-infrared (radiation heat) radiated from a human body.

The login execution section 161 transmits login information of a user to the file server 3 to log in the file server 3.

The list request section 162 after login requests list data associated with the login information from the file server 3. The list data indicates a list of song titles of a plurality of music scores. Specifically, the list data contains the song title data, the registration date data, and the price data. A "song title of a music score" is also referred to below as simply a "song title".

The list display controller 163 acquires the list data from the file server 3 and controls the display 111 to display a list of a plurality of song titles.

The sorting section 164 sorts the song titles according to a sorting condition. The sorting condition indicates for example rearrangement of the song titles in alphabetical order. The list display controller 163 controls the display 111 to display a list of the sorted song titles. The "sorting condition" corresponds to a "first specific condition".

The filtering section 165 filters the song titles according to a filtering condition and outputs a part of the song titles. The filtering condition is for example extraction and output of song titles of which the first letter is any of A to H from among the song titles. The list display controller 163 controls the display 111 to display a list of the part of the song titles. The "filtering condition" corresponds to a "second specific condition".

The selection receiving section 166 receives user selection of a song title from the list For example, the selection receiving section 166 receives selection of a song title from a list displayed on the display 111 according to a user operation on the operation panel 11.

The data request section 167 requests image formation data that corresponds to the song title selected by the user from the file server 3. The image formation data contains music score data corresponding to the song title. The "music score data corresponding to the song title" is an example of "article data corresponding to an article name".

The image formation controller 168 acquires the image formation data and controls the image forming device 14 to form a music score image based on the image formation data on a paper sheet P. The "music score image" refers to an image representing a music score. The "music score image" is an example of an "article image". The "article image" refers to an image representing an article.

The determination section 169 determines the number of times of image formation that the user is allowed to request based on an amount of money that the user is available to use and a price of the image formation data corresponding to the song title that the user has selected. The "number of times of image formation" indicates the number of copies of a music score to be generated. The music score is generated through formation of the music score image on a paper sheet P.

The counter 170 counts the number of times of successful image formation on paper sheets P out of the number of times of image formation that the user has requested.

The absence detector 171 detects the absence of a human body based on a detection result of the sensor S.

The logout request section 172 makes a request for user logout to the file server 3 upon the absence detector 171 detecting the absence of a human body.

As described with reference to FIGS. 1-3, the list display controller 163 causes the display 111 to display the list of the song titles and the selection receiving section 166 receives user selection of a song title from the displayed list. Furthermore, the image formation controller 168 acquires the image formation data corresponding to the song title that the user has selected and controls the image forming device 14 to form the music score image on a paper sheet P based on the image formation data. In the above configuration, it is only required for the user to select the song title of a desired music score from the displayed list in the image forming apparatus 1. This can achieve formation (printing) of a music score image (article image) on a paper sheet P by an easy operation.

Furthermore, the music scores of the respective song titles in the displayed list each are a music score that the user has registered in the file server 3 and the song titles in the displayed list include the song title of the music score that the user has registered in the file server 3 using the terminal device 5. In the above configuration, a list of the song titles of the respective music scores that the user has registered is displayed on the display 111, thereby enabling the user to select the song title of a registered music score. Accordingly, it is only required for the user to select the song title of a desired music score from the list displayed in the image forming apparatus 1. This can achieve formation of a music score image (article image) corresponding to the song title (article name) of a registered music score on a paper sheet P by an easy operation.

Moreover, the logout request section 172 makes a request for user logout to the file server 3 upon the absence detector 171 detecting the absence of a human body. In the above configuration, the file server 3 executes user logout when the user leaves the image forming apparatus 1. Accordingly, a situation can be avoided in which another user is disabled to use the image forming apparatus 1 because of user login being kept in the file server 3 even though the image forming apparatus is not used. Any other users can be prevented from forming a music score image on a paper sheet P without authorization, thereby increasing security.

Upon the absence detector 171 detecting the absence of a human body, the logout request section 172 makes a request for user logout to the file server 3 in the first embodiment, which however should not be taken to limit the present disclosure. Upon the absence detector 171 detecting the absence of a human body in a situation in which a user still logs in the file server 3, the image forming apparatus may raise an alarm, for example. In the above configuration, user logout from the file server 3 against user's intention can be avoided.

The article in the first embodiment is, but is not limited to, a music score. It is only required that an image representing the article, that is, an article image can be formed on a paper sheet P. Examples of the article include a photograph, a literature, and a cartoon.

Figure 4:
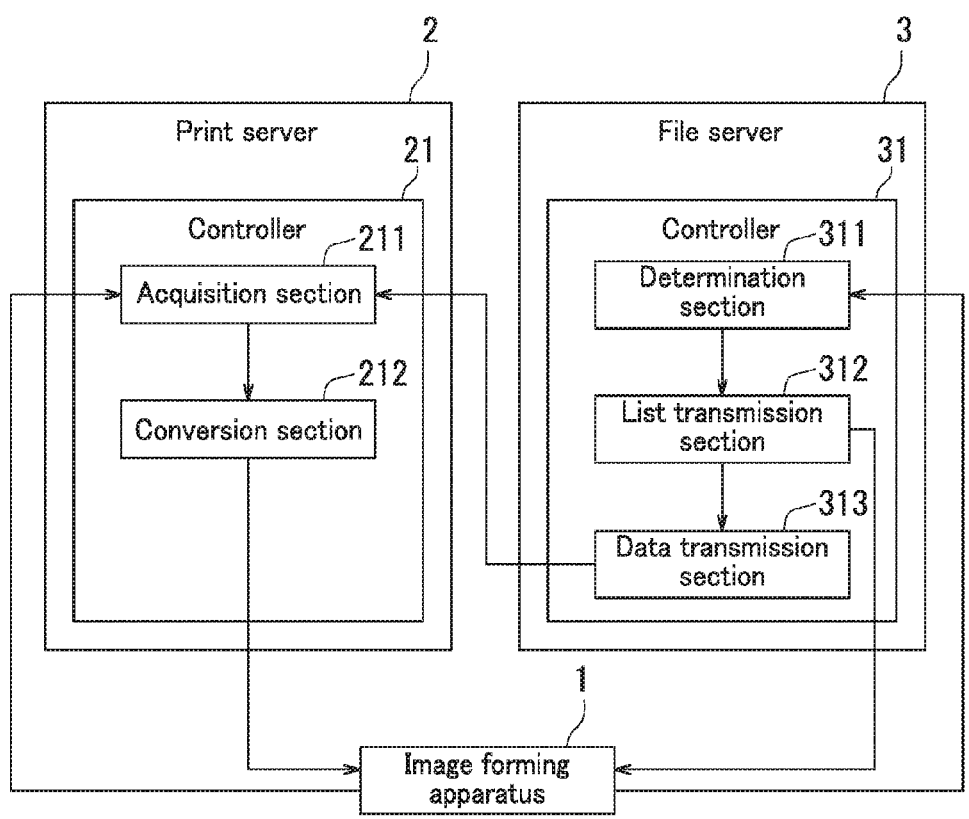
FIG. 4 depicts respective functions of a controller of a print server and a controller of a file server according to the first embodiment.

Respective functions of the controller 21 of the print server 2 and the controller 31 of the file server 3 will be described next with reference to FIGS. 1 and 4. FIG. 4 depicts the respective functions of the controllers 21 and 31.

As illustrated in FIG. 4, the controller 21 includes an acquisition section 211 and a conversion section 212. Specifically, the processor 21A of the controller 21 executes the control programs reads out from the storage 21B to function as the acquisition section 211 and the conversion section 212, as illustrated in FIGS. 1 and 4.

The controller 31 includes a determination section 311, a list transmission section 312, and a data transmission section 313. Specifically, the processor 31A of the controller 31 executes the control programs read out from the storage 31B to function as the determination section 311, the list transmission section 312, and the data transmission section 313, as illustrated in FIGS. 1 and 4.

The acquisition section 211 acquires from the file server 3 (data transmission section 313) source data corresponding to the song title that the user has selected. The source data contains at least either of text data and image data. The source data in the present embodiment contains music score data corresponding to a song title. The "music score data corresponding to a song title" is an example of "article data corresponding to an article name". Note that the data format of the source data is different from that of the image formation data.

The conversion section 212 generates image formation data by converting the source data to data in a data format processable by the image forming apparatus 1. For example, the conversion section 174 generates image formation data by describing the source data in a page description language. The image formation controller 168 of the image forming apparatus 1 acquires the image formation data from the conversion section 212.

The determination section 311 determines whether or not the login information transmitted by the login execution section 161 of the image forming apparatus 1 matches login information registered in the file server 3. Specifically, the storage 31B of the file server 3 stores plural pieces of login information therein and the determination section 311 determines whether or not the login information received from the login execution section 161 matches any of the plural pieces of login information stored in the storage 31B.

The list transmission section 312 executes the following processing upon match of the login information received from the login execution section 161 with any piece of the login information stored in the storage 31B. The processing is that the list transmission section 312 transmits list data corresponding to the received login information to the list display controller 163 of the image forming apparatus 1.

When the data request section 167 of the image forming apparatus 1 requests image formation data corresponding to the song title, the data transmission section 313 transmits source data corresponding to the song title to the acquisition section 211 of the print server 2.

The list transmission section 312 performs the following processing when the login information received from the login execution section 161 matches any piece of the login information stored in the storage 31B as described with reference to FIGS. 1 and 4. The processing is that the list transmission section 312 transmits list data corresponding to the login information to the list display controller 163 of the image forming apparatus 1. In the above configuration, the list display controller 163 can readily acquire the list data corresponding to the login information.

A song title list 600 will be described next with reference to FIGS. 3 and 5. FIG. 5 indicates the song title list 600 that the image forming apparatus 1 (list display controller 163) causes the display 111 to display. As illustrated in FIG. 5, the song title list 600 contains one or more song titles 601, one or more registered dates 602, one or more first prices 603, and one or more second prices 604. The song title list 600 corresponding to an example of a "list".

The song titles 601 each indicate a song title of a music score that the user has registered in the file server 3. The registration dates 602 each indicates a date on which the user has registered a corresponding music score. The first and second prices 603 and 604 each indicate a price of the corresponding music score that the user has registered. The first prices 603 each indicate a price of a music score at first-time image formation. The second prices 604 each indicate a price of a music score at second- and subsequent-time image formation.

The user can form (print) an image of a desired music score on a paper sheet P through selection of the song title of the desired music score by referencing the song titles 601 listed in the song title list 600 displayed on the display 111.

The music score image is preferably formed such that copying thereof is prohibited. Any known technique used in bill printing can be adopted in order that the music core image is prohibited from being copied.

Figure 6:
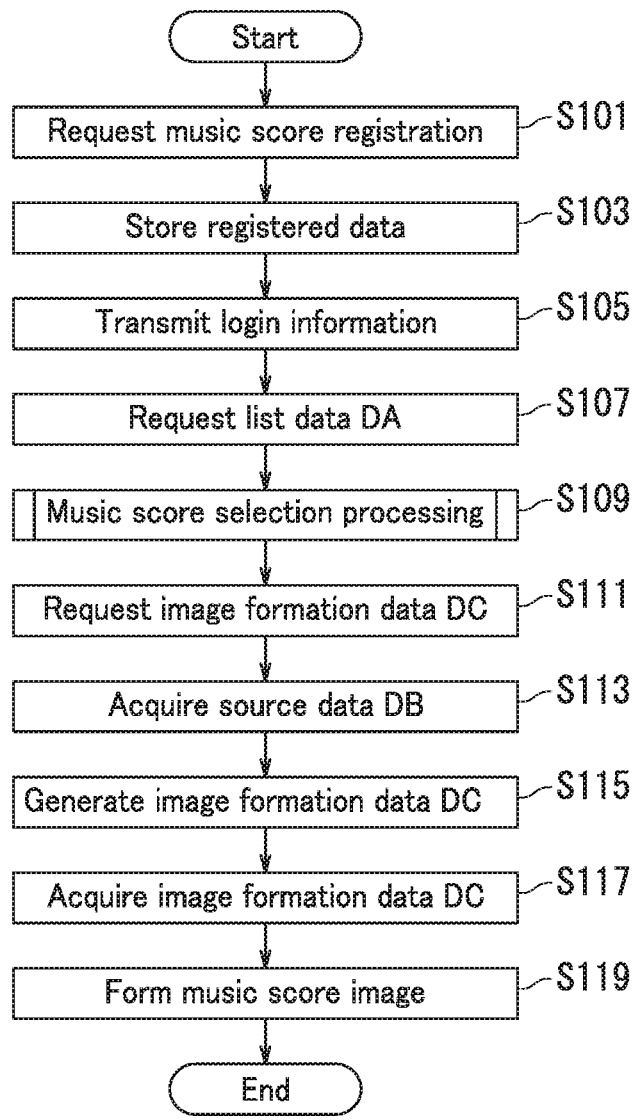
FIG. 6 is a flowchart depicting processing performed by the image forming system according to the first embodiment.
Figure 7:
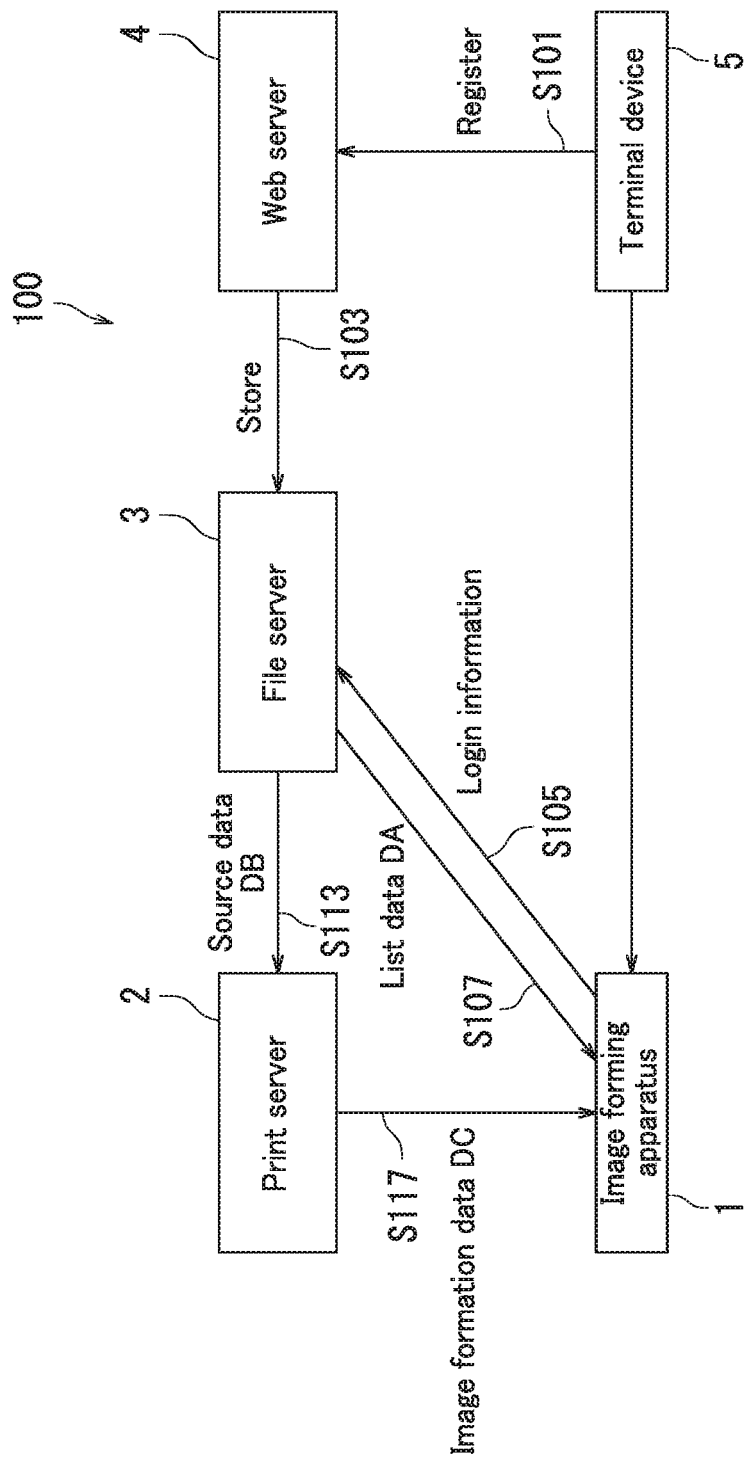
FIG. 7 is a block diagram illustrating the processing performed by the image forming system according to the first embodiment.

Processing performed by the image forming system 100 will be described next with reference to FIGS. 1-7. FIG. 6 is a flowchart depicting the processing performed by the image forming system 100. FIG. 7 is a block diagram illustrating the processing by the image forming system 100.

As illustrated in FIGS. 6 and 7, a user operates the terminal device 5 to access to the web server 4 for request for registration of a music score at Step S101. Specifically, the user accesses the web server 4, searches a desired music score, and makes a request for registration of the desired music score through operation on the terminal device 5.

Next, the file server 3 acquires registration data from the web server 4 and stores it in the file server 3 at Step S103. Registration of the music score is performed through storage of the registration data in the web server 4.

The registration data is data pertaining to the music score for which registration is requested. Specifically, the registration data contains login information, song title data, registration date data, and price data. The login information indicates an ID (identification) of a user who has registered the music score and information such as a password. The song title data indicates a song title of the music score that the user has registered. The registration date data indicates a date on which the user has registered the music score. The price data indicates a price of the music score that the user has registered.

Subsequently, the login execution section 161 of the image forming apparatus 1 transmits the login information of the user to the file server 3 at Step S105. The determination section 311 then determines whether or not the login information transmitted by the login execution section 161 matches any piece of the login information registered in the file server 3.

At S107, the list request section 162 requests list data DA indicating a list of a plurality of song titles from the file server 3. Further, when the determination section 311 determines that the login information transmitted by the image forming apparatus 1 matches any piece of the login information registered in the file server 3, the list transmission section 312 performs the following processing. The processing is that, the list transmission section 312 creates list data DA based on plural pieces of registered data each containing the login information transmitted by the image forming apparatus 1. The list transmission section 312 then transmits the list data DA corresponding to the registration data containing the login information to the image forming apparatus 1. The list display controller 163 acquires the list data DA from the file server 3 and controls the display 111 to display the list data DA in the form of a list.

Next, the image forming apparatus 1 performs "music score selection processing" at Step S109. The "music score selection processing" refers to processing of performing sorting processing and filtering processing on the list displayed on the display 111 according to a user instruction and receiving selection of a song title from the user.

At Step S111, the data request section 167 of the image forming apparatus 1 requests image formation data DC corresponding to the song title that the user has selected from the file server 3. The data transmission section 313 transmits source data DB corresponding to the song title to the print server 2.

Subsequently, the acquisition section 211 acquires the source data DB from the file server 3 at Step S113.

The conversion section 212 then converts the source data DB to a data in a data format processable by the image forming apparatus 1 to generate image formation data DC at Step S115.

Thereafter, the image formation controller 168 acquires the image formation data DC from the print server 2 at Step S117.

The image formation controller 168 then controls the image forming device 14 to form on a paper sheet P a music score image based on the image formation data DC at Step S119. Then, the processing ends.

As described above with reference to FIGS. 1-7, the conversion section 212 generates the image formation data DC. The image formation controller 168 then acquires the image formation data DC from the conversion section 212. The above configuration can eliminate the need of the image forming apparatus 1 to generate the image formation data DC from the source data DB. As a result, a burden on the controller 16 of the image forming apparatus 1 can be reduced.

Figure 8:
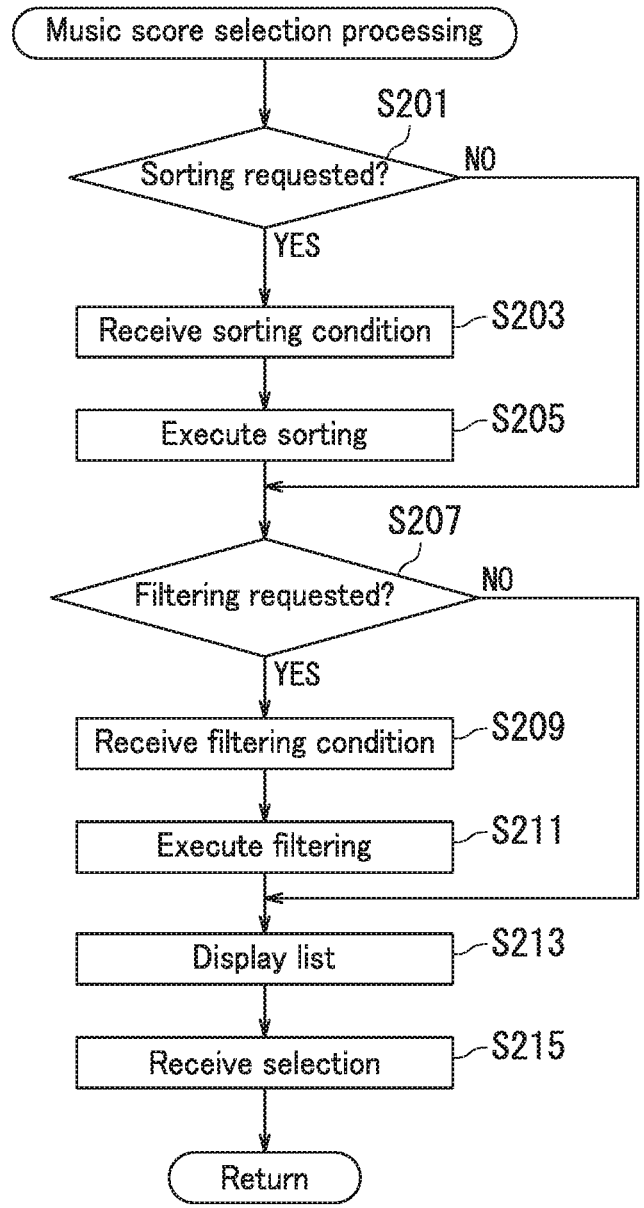
FIG. 8 is a flowchart depicting music score selection processing performed by the image forming apparatus according to the first embodiment.

The "music score selection processing" will be described next with reference to FIGS. 3 and 8. FIG. 8 is a flowchart depicting the music score selection processing performed by the image forming apparatus 1.

As depicted in FIG. 8, the sorting section 164 determines whether or not the sorting processing is requested based on a user operation on the operation panel 11.

Upon determination that the sorting processing is not requested (NO at Step S201), the routine proceeds to Step S207. Upon determination that the sorting processing is requested (YES at Step S201), the routine proceeds to Step S203.

At Step S203, the sorting section 164 receives a sorting condition according to a user operation on the operation panel 11.

The sorting section 164 then performs the sorting processing on the list data DA under the sorting condition at Step S205.

At Step S207, the filtering section 165 determines whether or not the filtering processing is requested based on a user operation on the operation panel 11.

Upon determination that the filtering processing is requested (NO at Step S207), the routine proceeds to Step S213. Upon determination that the filtering processing is requested (YES at Step S207), the routine proceeds to Step S209.

The filtering section 165 then receives a filtering condition according to a user operation on the operation panel 11 at Step S209.

The filtering section 165 then performs the filtering processing on the list data DA under the filtering condition at Step S211.

The list display controller 163 then causes the display 111 to display the list data DA in the form of a list at Step S213.

Subsequently, the selection receiving section 166 receives user selection of a song title in response to a user operation on the operation panel 11 at Step S215. The processing then returns to Step 111 in FIG. 6.

As described with reference to FIGS. 3 and 8, the sorting section 164 performs the sorting processing on the list data DA under the sorting condition. In the above configuration, the list data DA can be rearranged in order as the user desires. As a result, a list that can let the user readily select a song title can be displayed on the display 111, thereby facilitating user selection of the song title.

Furthermore, the filtering section 165 performs the filtering processing on the list data DA under the filtering condition. In the above configuration, a song title having less or no possibility that the user may select can be deleted from the list data DA. As a result, the number of songs displayed in the list can be reduced, thereby further facilitating user selection of a song title.

The image forming apparatus 1 in the present embodiment includes, but is not limited to, the sorting section 164 and the filtering section 165. The image forming apparatus 1 may include either one of the sorting section 164 and the filtering section 165. In the above configuration, the configuration of the controller 16 of the image forming apparatus 1 can be simplified.

Figure 9:
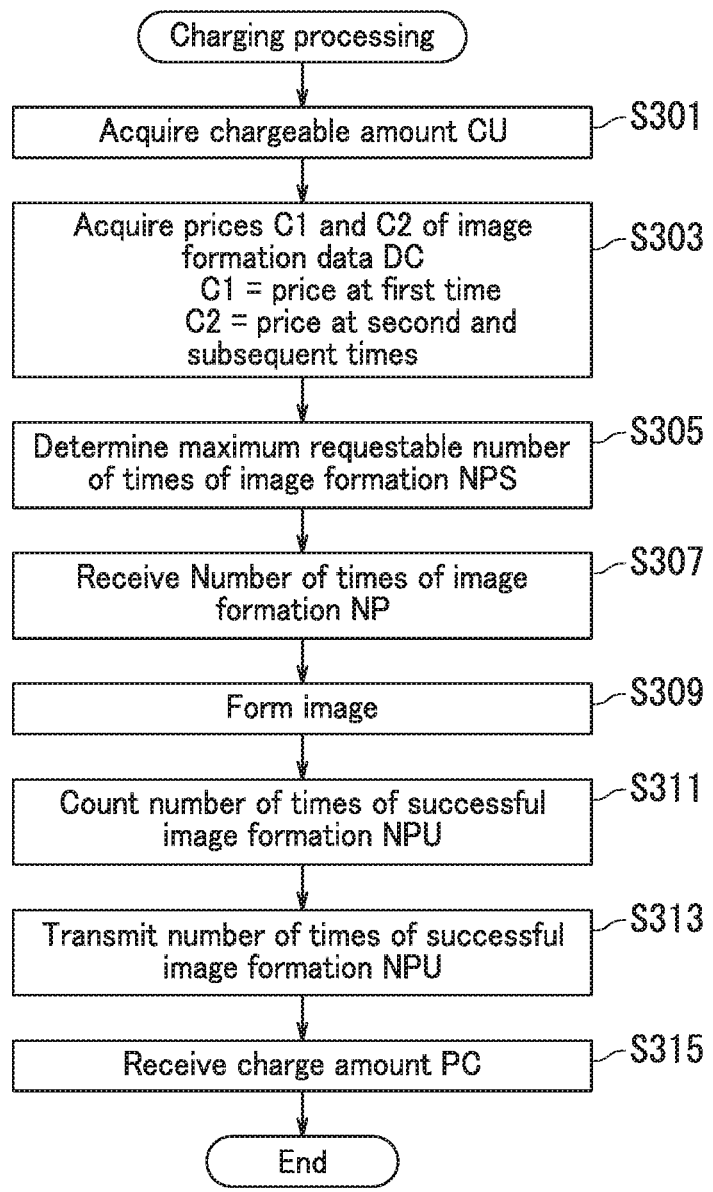
FIG. 9 is a flowchart depicting charging processing performed by the image forming apparatus according to the first embodiment.
Figure 10:
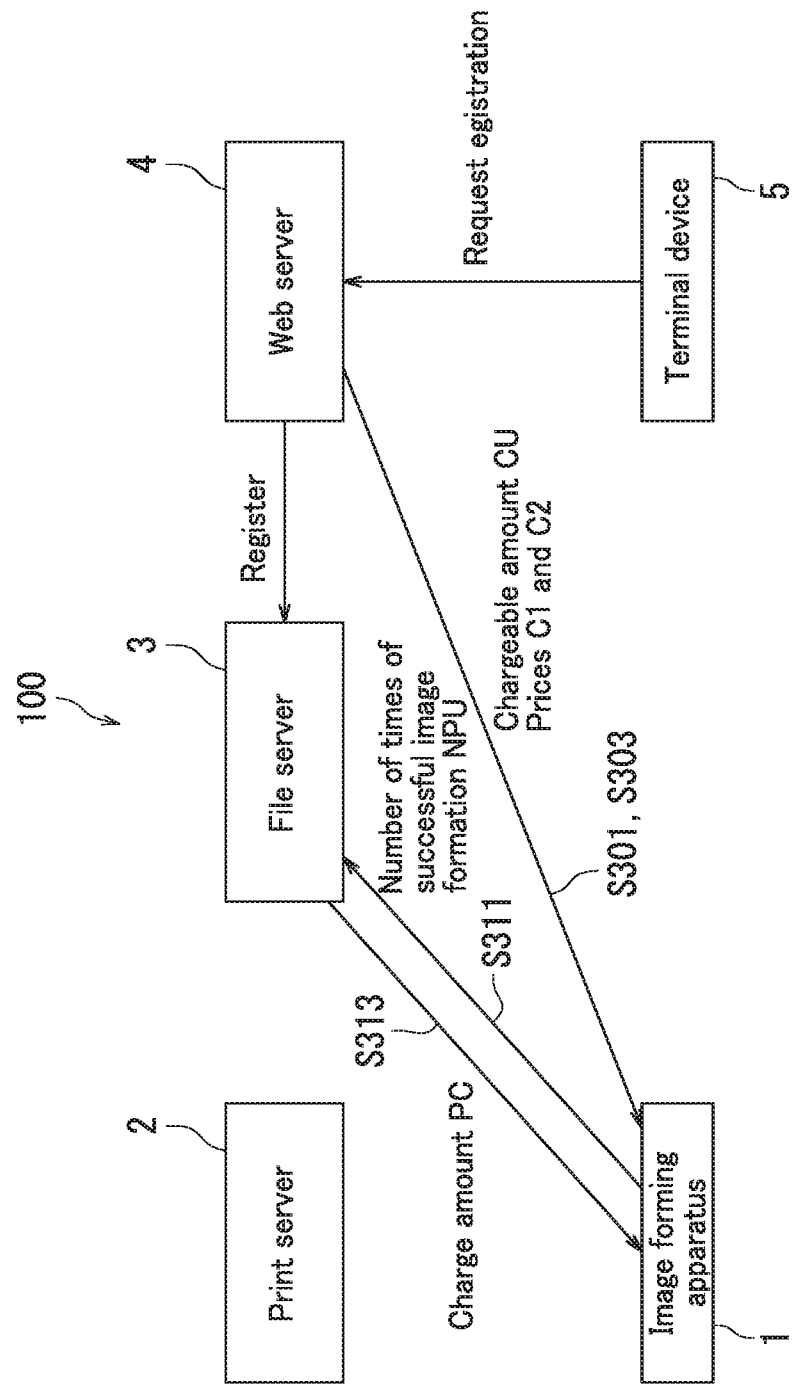
FIG. 10 is a block diagram illustrating the charging processing performed by the image forming apparatus according to the first embodiment.

The "charging processing" will be described next with reference to FIGS. 3, 5, 9, and 10. The "charging processing" refers to processing to determine a charge amount PC of charge to the user. FIG. 9 is a flowchart depicting the "charging processing" performed by the image forming apparatus 1. FIG. 10 is a block diagram illustrating the "charging processing" performed by the image forming apparatus 1.

As illustrated in FIGS. 9 and 10, the determination section 169 acquires from the web server 4 a chargeable amount CU of money that the user is available to use at Step S301. The chargeable amount CU is for example a remainder of a prepaid amount.

Subsequently, the determination section 169 acquires a price C1 and a price C2 of the image formation data DC from the web server 4 at Step S303. The prices C1 and C2 are contained in the price data of the list data DA.

The price C1 corresponds to one of the first prices 603 in FIG. 5, and the price C2 corresponds to one of the second prices 604 in FIG. 5. The prices C1 and C2 are prices C1 and C2 of a music score, respectively, in the present embodiment. The price C1 indicates a price at M-th-time image formation. M is an integer of at least 1 and for example "1". That is, the price C1 indicates a price of a music score for example at first-time image formation. The price C2 indicates a price at N-th-time image formation. N is an integer larger than M and for example at least 2. That is, the price C2 indicates a price of the music score for example in the second- and subsequent-time image formation.

At Step S305, the determination section 169 determines a maximum requestable number of times of image formation (the number of printing copies) NPS that the user is allowed to request and displays it on the display 111.

Specifically, the determination section 169 determines the maximum requestable number of times of image formation NPS based on the chargeable amount CU and the prices C1 and C2. More specifically, the determination section 169 determines a maximum number of times of image formation NP that satisfies the following expression (1) as the maximum requestable number of times of image formation NPS.

$$C1 + C2 \times (NP-1) \leq CU \qquad (1)$$

According to a user operation to specify a number of times of image formation NP on the operation panel 11, the image formation controller 168 receives the specified number of times of image formation NP at Step S307.

When the specified number of times of image formation NP is larger than the maximum requestable number of times of image formation NPS, the image formation controller 168 causes the display 111 to display a message indicating credit shortage and re-receive another specified number of times of image formation NP.

The image formation controller 168 then forms on a paper sheet P a music score image based on the image formation data DC at Step S309.

Subsequently, at Step S311, the counter 170 counts the number of times of successful image formation NPU out of the specified number of times of image formation NP the user has specified.

The counter 170 then transmits the number of times of successful image formation NPU to the file server 3 at Step S313. The file server 3 calculates a charge amount PC based on the number of times of successful image formation NPU and the prices C1 and C2 and transmits a calculation result to the image forming apparatus 1. Specifically, the file server 3 calculates the charge amount PC using the following expression (2). Furthermore, the file server 3 stores the number of times of successful image formation NPU in association with corresponding registration data to the storage 31B.

$$PC = C1 + (NPU-1) \times C2 \qquad (2)$$

At Step S315, the image formation controller 168 receives the charge amount PC from the file server 3 and causes the display 111 to display the charge amount PC. The processing then ends.

As described above with reference to FIGS. 3, 9, and 10, the determination section 169 determines the maximum requestable number of times of image formation NPS based on the chargeable amount CU and the prices C1 and C2 and the determined maximum requestable number of times of image formation NPS is displayed on the display 111. In the above configuration, the user can recognize the maximum requestable number of times of image formation NPS. Accordingly, a situation can be prevented in which the user requests printing of which number of times of image formation NP is larger than the maximum requestable number of times of image formation NPS. Thus, a user friendliness can be enhanced.

The price of the image formation data DC includes the price C1 at the first-time image formation and the price at the second- and subsequent-time image formation. In the above configuration, a provider of a music score who possesses the web server 4 and the file server 3 can properly determine a price of the music score according to the number of times of successful image formation NPU. The charge amount is determined according to the number of times of successful image formation NPU. This can prevent unlimited-time formation of a music score image on a paper sheet P.

Furthermore, the counter 170 counts the number of times of successful image formation NPU on a paper sheet P. This can enable determination of the charge amount PC based on the number of times of successful image formation NPU. Accordingly, charges for unsuccessful image formation on a paper sheet P in a situation in which image formation is failed can be prevented. In short, proper charging can be achieved.

The price of the image formation data DC includes the price C1 at first-time image formation and the price C2 at second- and subsequent-time image formation in the present embodiment, which however should not be taken to limit the present disclosure. The price of the image formation data DC may include a price CM at M-th-time image formation and a price CN at N-th-time image formation. M is an integer of at least 1, and N is an integer larger than M. The price CN is different from the price CM. For example, M is any one of 1 to 3 and N is 4 or larger. In the above configuration, a provider of a music score who possesses the web server 4 and the file server 3 can further properly determine the price of the music score by determining M, N, the prices CM and CN to be respective appropriate values.

Second Embodiment

Figure 11:
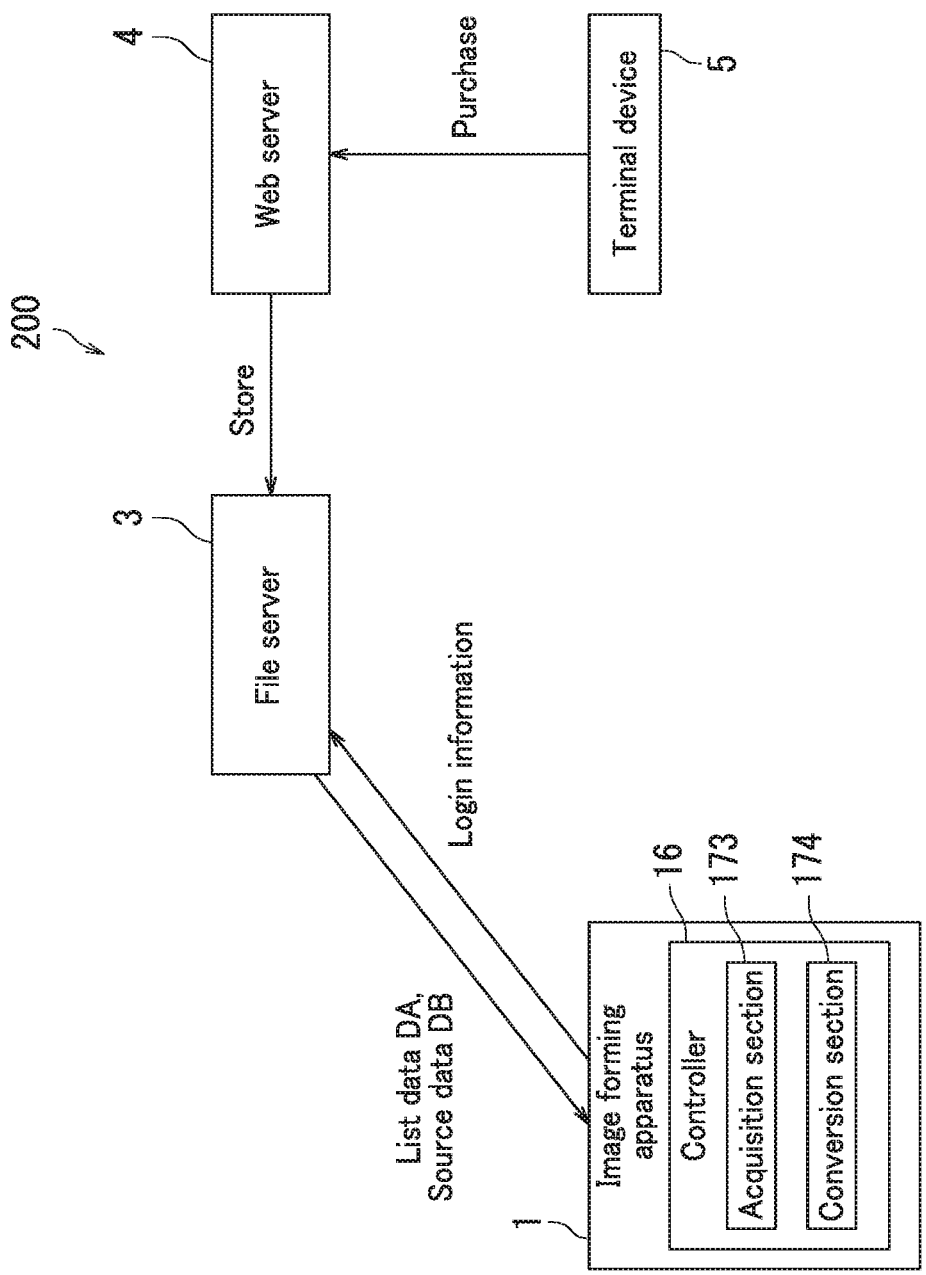
FIG. 11 is a block diagram indicating processing performed by an image forming system according to a second embodiment.

An image forming system 200 according to a second embodiment of the present disclosure will be described next with reference to FIG. 11. The image forming system 200 is the same as the image forming system 100 according to the first embodiment in all aspects other than that no print server 2 is included and an image forming apparatus 1 of the image forming system 200 is different in function from that of the image forming system 100.

Specifically, the image forming apparatus 1 has a function of the print server 2 of the image forming system 100. That is, as illustrated in FIG. 11, the controller 16 of the image forming apparatus 1 includes an acquisition section 173 and a conversion section 174 in addition to the login execution section 161 to the logout request section 172 illustrated in FIG. 3. The acquisition section 173 corresponds to the acquisition section 211 illustrated in FIG. 4. The conversion section 174 corresponds to the conversion section 212 illustrated in FIG. 4.

The acquisition section 173 acquires source data corresponding to a song title that the user has selected as first image formation data from the file server 3 (data transmission section 313). The source data contains at least either one of text data and image data. The "first image formation data" corresponds to "image formation data".

The conversion section 174 converts the first image formation data to data in a data format processable by the image forming apparatus 1 to generate second image formation data. For example, the conversion section 174 generates the second image formation data by describing the first image formation data in a page description language. The image formation controller 168 then controls the image forming device 14 to form a music score image based on the second image formation data on a paper sheet P. The second image formation data is generated from the first image formation data, and therefore, the music score image is an image based on the first image formation data.

The image forming system 200, which includes no print server 2, can have simpler configuration than the image forming system 100.

Embodiments of the present disclosure have been described so far with reference to the drawings. However, the present disclosure is not limited to the above-described embodiments and can be practiced in various ways within the scope not departing from the gist of the present disclosure (for example, the following (1)-(11)). The drawings schematically illustrate elements of configuration in order to facilitate understanding and properties of elements of configuration illustrated in the drawings, such as thickness, length, and number thereof, may differ from actual properties thereof in order to facilitate preparation of the drawings. Furthermore, properties of elements of configuration described in the above embodiments, such as shapes and dimensions, are merely examples and are not intended as specific limitations. Various alterations may be made so long as there is no substantial deviation from the configuration of the present disclosure.

(1) As has been described with reference to FIG. 1, the image forming apparatus 1, the print server 2, the file server 3, the web server 4, and the terminal device 5 are communicated with one another via the network NW, which however should not be taken to limit the present disclosure. It is only required that the following communication is enabled.

The image forming apparatus 1 communicates with the print server 2, the file server 3, the web server 4, and the terminal device 5.

The file server 3 communicates with the print server 2 and the web server 4.

The terminal device 5 communicates with the file server 3.

(2) As has been described with reference to FIG. 1, the terminal device 5 makes a request for music score registration to the web server 4, which however should not be taken to limit the present disclosure. The image forming apparatus 1 may make a request for music score registration to the web server 4. In addition, either or both of the terminal device 5 and the image forming apparatus 1 may make a request for deletion of music score registration to the web server 4.

(3) As has been described with reference to FIG. 2, the image forming apparatus 1 is a color copier in the embodiment, which however should not be taken to limit the present disclosure. It is only required that the image forming apparatus 1 can form an image on a paper sheet P. For example, the image forming apparatus 1 may be a monochrome copier. Alternatively, the image forming apparatus 1 may be for example a multifunction peripheral.

(4) As has been described with reference to FIG. 3, the image forming apparatus 1 makes a request for user logout to the file server 3 upon detection of absence of a human body, which however should not be taken to limit the present disclosure. The image forming apparatus 1 may make a request for logout for example according to a user operation on the operation panel 11. Alternatively, the image forming apparatus 1 may make a request for logout for example according to an instruction from the terminal device 5.

(5) As has been described with reference to FIG. 3, the controller 16 of the image forming apparatus 1 acquires image formation data corresponding to a song title in addition to acquisition of list data from the file server 3, which however should not be taken to limit the present disclosure. A configuration is possible in which at least part of the processing that the controller 16 of the image forming apparatus performs may be performed according to a user operation on the operation panel 11. For example, the controller 16 may acquire the list data according to a user operation on the operation panel 11.

(6) As has been described with reference to FIG. 3, the sorting condition is rearrangement of the song titles in alphabetic order, which however should not be taken to limit the present disclosure. The sorting condition may be for example rearrangement of the song titles in order of printing frequency or in order of registration date. Alternatively, the sorting condition may be for example rearrangement of the song titles in alphabetic order of composers of the song titles.

(7) As has been described with reference to FIG. 3, the filtering condition is such that the first letters of the song titles are any of A to H, which however should not be taken to limit the present disclosure. The filtering condition may be such that the initials of composers of the respective music scores are in any specific alphabet range. Alternatively, the filtering condition may be such that an integrated value of each number of times of image formation is in a specific range (e.g., zero).

(8) As has been described with reference to FIG. 5, the list data contains, but is not limited to, the song title data, the registration date data, and the price data. The list data may contain various data pertaining to a music score. For example, the list data may contain at least one of copy number data indicating an integrated value of each number of times of image formation, composer data indicating the name of a composer, and artist data indicating the name of an artist.

(9) As has been described with reference to FIGS. 9 and 10, the web server 4 stores therein a chargeable amount CU that the user is available to use, which however should not be taken to limit the present disclosure. For example, the charging processing may be performed using a credit card. In the above configuration, the chargeable amount CU is determined based on a credit limit of the credit card. Alternatively, the charging processing may be performed for example in a prepaid manner. In the above configuration, a predetermined amount of money (e.g., 1,000 yen) is prepaid to the web server 4 and the remainder corresponds to the chargeable amount CU. Yet, the charging processing may be performed using web money.

(10) As has been described with reference to FIGS. 9 and 10, the image forming apparatus 1 performs the charging processing, which however should not be taken to limit the present disclosure. The terminal device 5 may perform the charging processing in requesting for music score registration.

(11) As has been described with reference to FIGS. 9 and 10, the image forming apparatus 1 acquires the source data as the first image formation data from the file server 3, which however should not be taken to limit the present disclosure. The image forming apparatus 1 may acquire the second image formation data described in a page description language from the file server 3.

What is claimed is:

1. An image forming apparatus comprising: a display; an image forming device; and a controller that controls the display and the image forming device, wherein the controller includes:

a login execution section configured to transmit login information of a user to a first server to log in the first server;

a list request section configured to request list data indicating a list of article names of a plurality of articles from the logged-in first server;

a list display controller configured to acquire the list data from the first server and control the display to display the list data in form of a list;

a selection receiving section configured to receive selection of an article name of an article from among the article names listed in the list from the user;

a data request section configured to request image formation data from the first server, the image formation data corresponding to the article name that the user has selected; and an image formation controller configured to acquire the image formation data and control the image forming device to form an image of the article on a sheet based on the image formation data, the articles each are a music score, the article names each are a song title of the music score, the image of the article represents an image of the music score, the controller further includes a determination section configured to determine a number of maximum requestable times of image formation that the user is allowed to request based on a chargeable amount that the user is available to use and a price of the image formation data corresponding to the article name that the user has selected, the price of the image formation data includes a price at M-th-time image formation per one print and a price at N-th-time image formation for one print, the price at M-th-time image formation for one print is different from the price at N-th-time image formation for one print, M is an integer of at least 1 and N is an integer lager than M, and the price at N-th-time image formation for one print is lower than the price at M-th-time image formation for one print.

2. The image forming apparatus according to claim 1, wherein the article names each indicate an article name that the user has registered in the first server using a terminal.

3. The image forming apparatus according to claim 1, wherein the controller further includes a sorting section, the sorting section performs sorting processing on the article names under a first specific condition, and the list display controller controls the display to display a list of the article names that have been sorted.

4. The image forming apparatus according to claim 1, wherein the controller further includes a filtering section, the filtering section performs filtering processing on the article names under a second specific condition and outputs a part of the article names, and the list display controller controls the display to display a list of the part of article names.

5. The image forming apparatus according to claim 1, further comprising a sensor configured to detect a human body, wherein the controller includes:

an absence detector configured to detect absence of a human body based on a detection result of the sensor; and a logout request section configured to makes a request for user logout to the first server upon the absence detector detecting absence of a human body.

6. The image forming apparatus according to claim 1, wherein the controller further includes a counter configured to count a number of times of successful image formation out of a number of times of image formation that the user has requested.

7. The image forming apparatus according to claim 1, wherein the plurality of articles each are an article of which an image is capable of being formed on a sheet, and the image of the article represents the article.

8. The image forming apparatus according to claim 1, wherein the image of the article is formed such that copying thereof is prohibited.

9. The image forming apparatus according to claim 1, wherein the list data contains price data indicating respective prices of the articles.

10. An image forming system comprising:

the image forming apparatus according to claim 1; and a second server that communicates with the image forming apparatus and the first server, wherein the second server includes:

an acquisition section configured to acquire from the first server source data corresponding to the article name that the user has selected; and a conversion section configured to convert the source data to data in a data format processable by the image forming apparatus to generate the image formation data, and the image formation controller of the image forming apparatus acquires the image formation data from the second server.

11. An image forming system comprising:

the image forming apparatus according to claim 1; and the first server, wherein the first server includes:

a determination section configured to determine whether or not the login information transmitted by the login execution section of the image forming apparatus matches login information registered in the first server; and a list transmission section configured to transmit list data corresponding to the transmitted login information to the image forming apparatus upon match between the transmitted login information and the registered login information.

* * * * *